US009437013B2

(12) United States Patent
Douglas

(10) Patent No.: US 9,437,013 B2
(45) Date of Patent: Sep. 6, 2016

(54) SIMPLIFIED REAL TIME LOCATION-DEPENDENT COLOR-CODED DISPLAY ("CHLOROPLETH") SYSTEM AND METHOD

(71) Applicant: David Douglas, Aynor, SC (US)

(72) Inventor: David Douglas, Aynor, SC (US)

(*) Notice: Subject to any disclaimer, the term of this patent is extended or adjusted under 35 U.S.C. 154(b) by 0 days.

(21) Appl. No.: 14/692,719

(22) Filed: Apr. 21, 2015

(65) Prior Publication Data

US 2015/0227788 A1 Aug. 13, 2015

(51) Int. Cl.
*G06K 9/00* (2006.01)
*G06T 7/40* (2006.01)
*G06F 3/147* (2006.01)
*G09G 5/02* (2006.01)
*G06T 17/05* (2011.01)

(52) U.S. Cl.
CPC .............. *G06T 7/408* (2013.01); *G06F 3/147* (2013.01); *G06T 17/05* (2013.01); *G09G 5/02* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 2009/0005061 A1* | 1/2009 | Ward | G01S 5/021 455/456.1 |
| 2009/0058685 A1* | 3/2009 | Mc Call | G08G 1/005 340/995.24 |
| 2014/0280316 A1* | 9/2014 | Ganick | G06F 17/30522 707/769 |
| 2015/0119070 A1* | 4/2015 | Harris | H04W 64/00 455/456.1 |
| 2015/0179088 A1* | 6/2015 | Raman | G09B 21/001 348/62 |

* cited by examiner

*Primary Examiner* — Shervin Nakhjavan
(74) *Attorney, Agent, or Firm* — Barry Choobin; Patent 360

(57) ABSTRACT

The various embodiments herein provide a system for indicating a position-dependent color-coded information to a user with respect to a color-indicator map. The system comprises a mobile device to determine a location of the user, transmit that information to the server and receive a numerical score, display color-coded information, and repeat this process every couple of seconds. The details of the location of the user from the mobile device is received by a server. The server is associated with a computing device which is configured to calculate a numerical score with respect to the location and transmit that information back to the mobile device. The system further comprises of an RGB LED or array of RGB LEDs in communication with the mobile device which is configured to display position-dependent color-coded information to the user with respect to a color-indicator map.

6 Claims, 2 Drawing Sheets

SIMPLIFIED REAL TIME LOCATION-DEPENDENT COLOR-CODED DISPLAY ("CHLOROPLETH") SYSTEM AND METHOD

BACKGROUND

1. Technical Field

The embodiments herein generally relate to the fields of real-time location indication systems, GIS technology, and color indicator maps ("chloropleths"). The embodiments herein particularly relates to a portable system used for indicating a color-coded numerical value corresponding to a user's location within a color indication map that does not require any conventional form of display like a monitor, etcetera. The embodiments herein more particularly relates to a GPS-based chloropleth-indicator device.

2. Description of the Related Art

A typical use of a chloropleth for diagnostic purposes is to view an actual map on a monitor or other screen. In mobile settings, this is preferably done in conjunction with GPS technology so as to indicate the location (in the form of a cursor, dot, etcetera) of the user in real-time on the map display. However, the aforementioned technique requires a significant amount of computer processing power to display the map in addition to a significant amount of human attention and skill to operate a traditional geographic information system (GIS) program. Further, studying a map to properly determine one's location within a chloropleth while operating a vehicle is distracting, potentially dangerous, and in some jurisdictions possibly even illegal.

Hence there is a need for a chloropleth indicator device to display single "pixel" color values over time to indicate position-dependent information to the user as he/she travels "through the map". Further there is a need for a system which uses minimal attention and/or skill requirements to the user to casually determine the desirability or undesirability of his/her position from some type of quantitative standpoint, be it a single measurement ("income", "education scores") or a combination of factors to generate a "score". Still further there is a need for a real time location indication display system and method using reduced complexity of display within the chloropleth for providing a clear visual display to the user.

The above mentioned shortcomings, disadvantages and problems are addressed herein and which will be understood by reading and studying the following specification.

Objects of the Embodiments Herein

The primary object of the embodiments herein is to provide a simplified system for continuously indicating location-dependent color-coded information to a user in correspondence with a color indication map.

Another object of the embodiments herein is to provide a system and method to continuously utilize a user's location to display a single color value at any given moment corresponding to the user's location within a chloropleth map using a single RGB LED light or array of lights.

Yet another object of the embodiments herein is to provide a chloropleth display device for indicating color-coded, location-dependent information to a user in a way that minimizes distraction (attention requirements) for the user.

Yet another object of the embodiments herein is to develop a safe, readily understandable ("red, yellow or green", for example) method for indicating some measurement of desirability or undesirability of user's a location via a colored light or array of lights.

Yet another object of the embodiments herein is to provide a simplified GPS based chlorepleth display device for indicating this location-dependent information to a user as their geographic location changes.

These and other objects and advantages of the embodiments herein will become readily apparent from the following summary and the detailed description taken in conjunction with the accompanying drawings.

SUMMARY

The various embodiments herein provide a system and method for indicating position-dependent information to a user by utilizing a simplified GPS based chlorpleth indicator device in conjunction with a GIS ("Geographic Information System") enabled server. The system utilizes a GPS module configured to determine a location of the user. The system furthermore utilizes a mobile computing device to interpret GPS data, wirelessly connect to and send information over the internet, interpret numerical data received over the internet, and ultimately control the light display(s).

The details of the location of the user are received at a GIS-enabled server from the device. The server is associated with a computing device which is configured to calculate a numerical score corresponding to the received location details of the device. The system further comprises an output device in communication with the mobile computing device which is instructed to display different colors &/or color intensities as the user's location changes.

According to an embodiment herein, the output device comprises a number of Red-Green-Blue (RGB) Light Emitting Diodes (LEDs). A RGB LED or group of RGB LEDs continually radiates different, meaningful colors to represent real-time position-dependent color-coded information to the user which ideally relates to their objectives and diagnostic criteria.

According to an embodiment herein, the numerical score indicates/estimates the position-dependent value of the user's mobile device with respect to a given chloropleth, which is ultimately composed of numerically-scored regions on the GIS server.

According to an embodiment herein, the device contains a Global Positioning System (GPS) module configured to determine the location of user. The location is represented in-terms of a latitudinal co-ordinate and a longitudinal co-ordinate of a land/location.

According to an embodiment herein, the RGB LEDs are configured to radiate light of multiple color values and/or intensities of brightness. The light color &/or intensity radiated by the RGB LED(s) depends on the numerical score computed corresponding to the location of the user in addition to the user's preference for color-coding rules.

According to an embodiment herein, the system further utilizes a geographic information system (GIS) database, included in the server, configured to determine a numerical score corresponding to a user's given location received from the mobile device. In the current embodiment, the server is hosted at a central location, but future embodiments could one day include the GIS-enabled server itself inside of the mobile device.

The various embodiments herein provide a method for indicating position-dependent color-coded information of a user within color-indicator maps using a simple chloropleth device. The method comprises the steps of: determining a location of the user using a GPS module; receiving the user location from the mobile device by a GIS-enabled server; calculating a numerical score for the location by a computing device associated with a server; determining which color to display based on the numerical value received from the server; and displaying the position-dependent color-coded information of the user based on a color-indicator map of a output device. The user's location-dependent information is displayed on the device by via RGB LED illumination. The light color and intensity of the diode depends on the position of the user.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
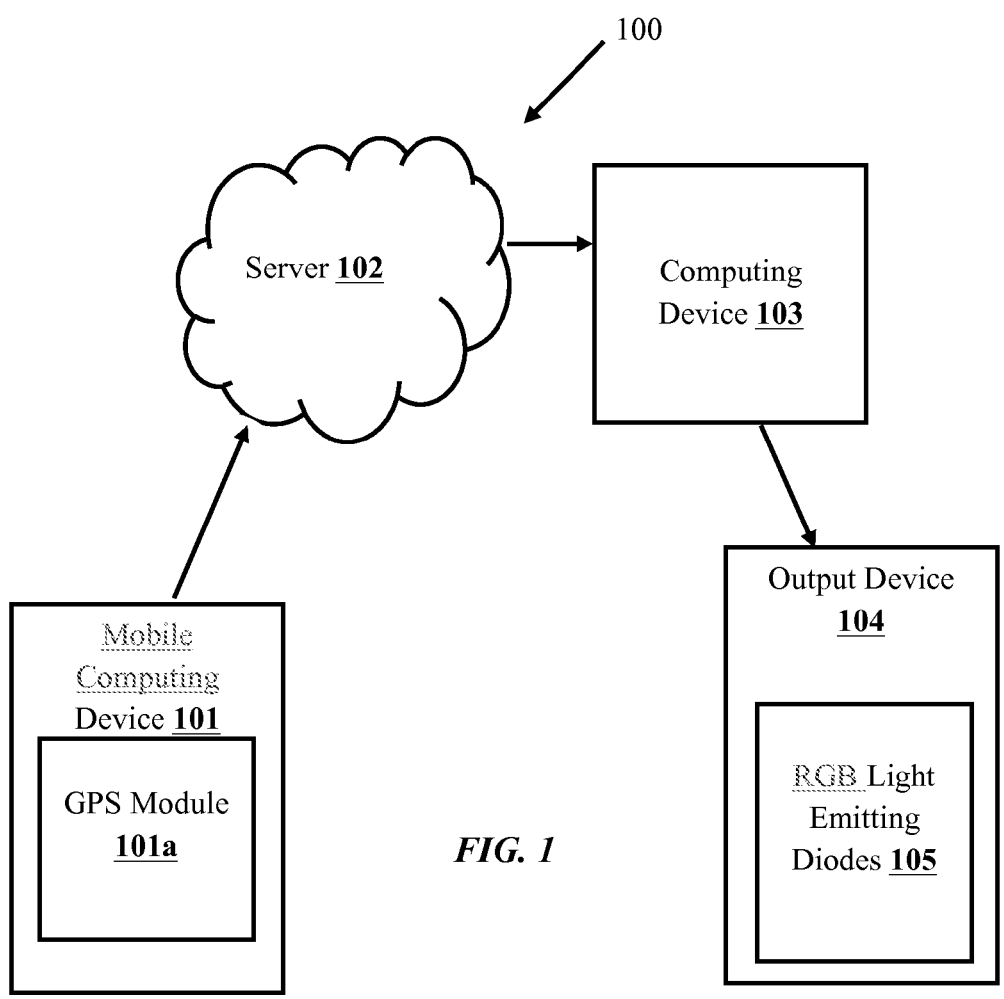
FIG. 1 illustrates a block diagram of a system for indicating location-dependent color-coded information to a user with regard to a color indication map using a simplified GPS based chloropleth device, according to an embodiment herein.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for indicating position-dependent color-coded information to a user with regard to color-indicator maps using a simplified GPS based chloropleth indicator system. The system comprises a mobile device which is a portable device configured to determine a location of the user, send and receive messages to the server, and control RGB LED output based on the numerical information received from the server. The details of the location of the user is received at the server from the mobile device. The server is associated with a computing device which is configured to calculate a numerical score based on the received location details of the mobile device. The system further comprises a RGB LED or array of RGB LEDs controlled by the mobile device which is configured to display position-specific color-coded information to the user with respect to a color-indicator map.

According to an embodiment herein, the mobile device comprises a plurality of Red-Green-Blue (RGB) Light Emitting Diodes (LEDs). A particular color & intensity is displayed on RGB LED(s) to represent a corresponding position of the user on the color indicator map.

According to an embodiment herein, the numerical score indicates/estimates position-dependent color-coded information to the user with respect to a color indicator map.

According to an embodiment herein, the mobile device comprises a Global Positioning System (GPS) module configured to determine the location of user. The location is represented in-terms of a latitudinal co-ordinate and a longitudinal co-ordinate of a land/location.

According to an embodiment herein, the RGB LEDs are configured to radiate light of multiple intensities and color values which are mutually different. The light color & intensity radiated by the RGB LED(s) is determined based on the numerical score received from the server and the color-coding preferences of the user.

According to an embodiment herein, the system further comprises a geographic information system (GIS) database, included in a server, configured to periodically determine the numerical score based on the user's given location at any moment.

The various embodiments herein provide a method for indicating a position of a user in a color-indicator maps using a simplified GPS based chloropleth device. The method comprises the steps of: determining a location of the user using a GPS module; receiving the user location from the mobile device by a server; calculating a numerical score for the location by a computing device associated with the server; utilizing the numerical score to determine the position-dependent color-coded information to be displayed to the user; and displaying the position-dependent color-coded information to the user with regard to a color-indicator map. The user's location is displayed on the output device by configuring the plurality of RGB LEDs on the color-indicator map to radiate light of a particular color with a preset or particular intensity.

The various embodiments herein provide a system and method for indicating position-dependent color-coded information of a user based on a color indictor map using a simplified GPS based chloropleth system. The system utilizes a Global Positioning Technology which uses a satellite navigation system for estimating a location of the user. The position-dependent color-coded information is determined with respect to the received numerical score and the user's color-coding preferences, and is displayed to the user by using a plurality of Red-Green-Blue (RGB) Light Emitting Diodes (LEDs) connected to the mobile device.

FIG. 1 illustrates a block diagram of a system for indicating a location-dependent color-coded information to a user with respect to a color indication map, according to an embodiment herein. The system 100 comprises a mobile device 101 which is a portable device in possession of the user. The mobile device 101 is any one of the following:

mobile phone, smartphone, tablet computer, PDA, laptop computer and the like devices. The mobile device 101 comprises a Global Positioning System (GPS) module 101a for determining the location of the user. The user's location is represented in terms of latitude and longitude co-ordinates. The mobile device 101 comprises an application program interface which receives the location co-ordinates from the GPS module 101a and transmits the co-ordinates as parameters to a server 102. The server 102 receives the location parameters from the mobile device 101 and calculates a numerical score by considering the parameters. The server 102 is associated with a computing device 103 which is configured to calculate the numerical value by considering the location of the user with respect to the reference point. The score is calculated for a grid square on a map in which the user is located. The score region has a single score depending on what the user is trying to do and the single numerical score is returned for the score region.

The numerical score is calculated with respect to a color indication map using a plurality of proprietary methods. The methods are configured to utilize a plurality of parameters comprising demographic data, proximity to retail locations, proximity to water bodies and the like information. The score is calculated for different users based on the respective objectives. For example, the objectives include, but not limited to, "a desirability of a home site" (based on for example, median area income, education statistics, and the like), or "desirability of an apartment site" (a walk-score, population density, market demand and supply, and the like)

Depending on the numerical score received from the server 102, the mobile device 101 is configured to transmit a plurality of instructions to the plurality of RGB LEDs 105 in an output device 104. The output device 104 is any electronic equipment available with the user. In an alternate option, the output device 104 is an electronic equipment that is accessed by another person, who needs to keep a track on the user's location. The RGB LEDs 105 are configured to emit a light at a plurality of color values depending on the position of the user within a color-coded display map. The output device 104 in communication with the mobile device 101, is configured to operate the RGB LEDs 105 to emit a particular light of preset intensity, and wherein the light intensity depends on the threshold range within which the numerical score is estimated. For example, suppose the range of possible numerical scores for a given color indicator map on the server is within a range of 0 and 34.5. According to the specific instructions provided by the user, a color key legend is created to determine a color to be radiated by the RGB LEDs when certain values for the numeric score are returned. The computing device 103 is configured to collect the location co-ordinates and calculate the numerical score for the location. The mobile device 101 determines which color & intensity to display based on the numerical score received and accordingly sends an instruction to the output device 104 to operate the RGB LEDs 105. For example, in-case the numerical score is greater than 34, the computing device 103 transmits the instruction to the output device to radiate light of a blue color with a preset intensity from the RGB LED. The pseudocode written in the mobile device 101 for controlling the output device 104 is mentioned in following section:

```
lat, lng = location_of_user;
score= get_score_from_server(lat, lng);
if score >= 34
```

-continued

```
        display_blue;
elsif score >= 33
        display_green;
elsif score >= 32
        display_yellow;
elsif score >= 31
        display_orange;
elsif score >= 30
        display_red;
else
        no_display;
end.
```

For the above example, the RGB LEDs 105 radiate a red intensity light, when the position-dependent numerical score received by the mobile device is between 30 and 30.99. The RGB LEDs 105 radiates light intensity in a green shade if the numerical score returned by the server is between 33 and 33.99. The user recognizes the position-dependent color-coded information with respect to a color indication map depending on the light intensity displayed by the RGB LEDs 105.

According to an embodiment herein, the system further comprises a geographic information system (GIS) database, incorporated in the server 102, configured to determine the numerical score for the user's given location 103.

Figure 2:
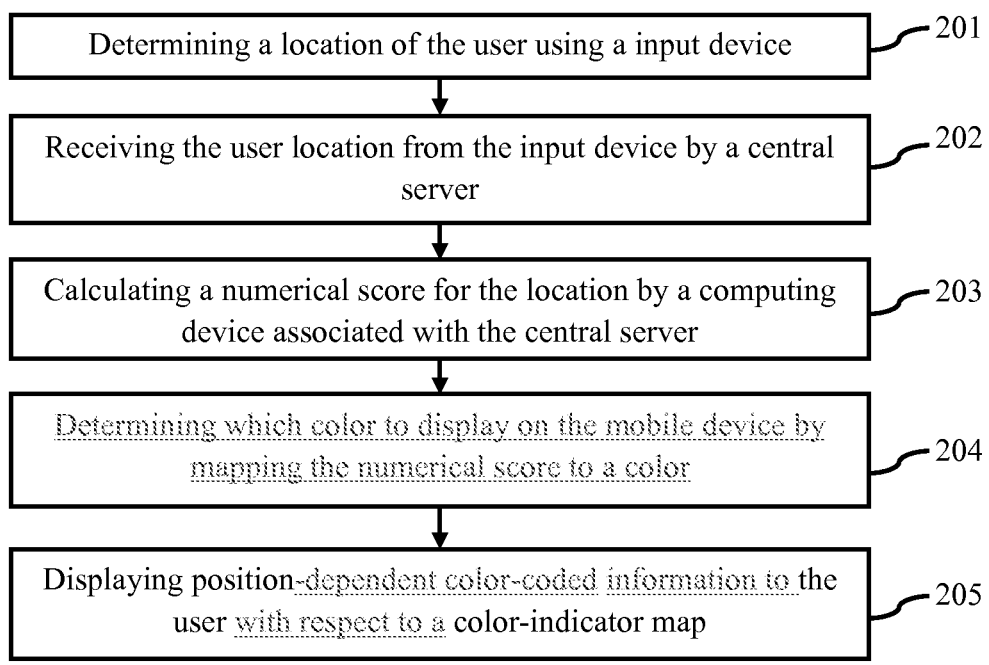
FIG. 2 illustrates a flowchart explaining the steps involved in a method for indicating the location of the user on the color indication map using a simplified GPS based chloropleth device, according to an embodiment herein.

FIG. 2 illustrates a flowchart explaining the steps involved in a method for indicating the location-dependent color-coded information of the user on the color indication map, according to an embodiment herein. The method comprises the steps of: determining a location of the user using a mobile device (201); receiving the user location from the mobile device by a server (202); calculating a numerical score for the location by a computing device associated with the server (203); determining the correct color-coded information to display based on the numerical score (201); and displaying position-specific color-coded information to the user with respect to a color-indicator map on an output device (205). The user's location-dependent color-coded information is displayed on the output device by configuring the plurality of RGB LEDs on the color-indicator map to radiate light of a particular color & intensity.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of

What is claimed is:

1. A system for indicating position-dependent of an user with regards to a color-indicator maps, the system comprising
- a mobile device, and wherein the device is a portable device configured to determine a location of the user, send and receive information from the server, and control the RGB LED illumination;
- a server configured to receive the location of the user from the mobile device;
- a computing device associated with the server, and wherein the computing device is configured to calculate a numerical score for the location;
- an output device in communication with the computing device, and wherein the output device is configured to display position-dependent color-coded information to the user with regard to a color indicator map,
- wherein the output device comprises a plurality of Red-Green-Blue (RGB) Light Emitting Diodes (LEDs), and wherein the RGB LED(s) radiate a particular color of preset intensity to represent the corresponding position-dependent information to the user with regard to a color indicator map.

2. The system according to claim 1, wherein the numerical score indicates the position-dependent information to the mobile device with respect to the reference point.

3. The system according to claim 1, wherein the mobile device comprises a Global Positioning System (GPS) module configured to determine the location of user, and wherein the location is represented in-terms of a latitudinal co-ordinate and a longitudinal co-ordinate.

4. The system according to claim 1, wherein the RGB LEDs are configured to radiate light in a plurality of colors, wherein the light intensity and color radiated by the RGB LED depends on the threshold range with in which the numerical score corresponding to the user's location occurs.

5. The system according to claim 1, further comprises a geographic information system (GIS) database, included in the server, and configured to determine the numerical score corresponding to the user's given location with respect to a particular color-indicator map.

6. A method for indicating position-dependent color-coded information to a user with respect to a color-indicator map, the method comprising steps of:
- determining a location of the user using a GPS module;
- receiving the user location from the mobile device by a server;
- calculating a numerical score for the location by a computing device associated with the server;
- determining the color & intensity of a RGB LED light or lights to be displayed based on the numerical value received from the server;
- displaying position-dependent color-coded information to the user with regard to a color-indicator map;
- wherein the user's location-specific color-coded information is displayed on the mobile device by configuring a plurality of RGB LEDs to radiate light of a particular intensity and color, and wherein the light intensity of the diode depends on the position of the user from the reference point.

* * * * *